(12) United States Patent
Porteret et al.

(10) Patent No.: US 10,793,111 B2
(45) Date of Patent: Oct. 6, 2020

(54) METHOD FOR VERIFYING A BIOMETRIC AUTHENTICATION

(71) Applicant: IDEMIA IDENTITY & SECURITY FRANCE, Courbevoie (FR)

(72) Inventors: Cyril Porteret, Courbevoie (FR); Christophe Soumah, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 29 days.

(21) Appl. No.: 16/368,743

(22) Filed: Mar. 28, 2019

(65) Prior Publication Data

US 2019/0299932 A1 Oct. 3, 2019

(30) Foreign Application Priority Data

Mar. 29, 2018 (FR) ..................................... 18 52739

(51) Int. Cl.
*B60R 25/25* (2013.01)
*G07C 9/00* (2020.01)
(Continued)

(52) U.S. Cl.
CPC .......... *B60R 25/25* (2013.01); *G06K 9/00885* (2013.01); *G06K 9/00979* (2013.01);
(Continued)

(58) Field of Classification Search
CPC ................ B60R 25/25; G06K 9/00885; G06K 9/00979; G07C 2009/00388;
(Continued)

(56) References Cited

U.S. PATENT DOCUMENTS

2012/0204035 A1* 8/2012 Camenisch ........... H04L 9/3231
713/186
2014/0277837 A1 9/2014 Hatton
(Continued)

FOREIGN PATENT DOCUMENTS

| AU | 6980200 A | 2/2001 |
| FR | 3050853 A1 | 11/2017 |
| WO | 2016/102888 A1 | 6/2016 |

OTHER PUBLICATIONS

"Preliminary Search Report," FR Application No. 1852739 (dated Jan. 9, 2019) with English translation cover sheet.
(Continued)

*Primary Examiner* — Yong Hang Jiang
(74) *Attorney, Agent, or Firm* — Womble Bond Dickinson (US) LLP

(57) ABSTRACT

The invention proposes a method for the remote control of a locking equipment (2) for a vehicle (20) via a mobile terminal (1) comprising data processing means (11) configured to implement a given cryptographic function and biometric acquisition means (14), the mobile terminal (1) being connected to the locking equipment (2) and to a server (3) via a network (10), the method being characterized in that it comprises the implementation of steps of:
(a) Issuing, from the terminal (1) to the server (3), an authentication request relative to the locking equipment (2);
(b) Acquiring a candidate biometric datum by the acquisition means (14);
(c) Verifying, by data processing means (31) of the server (3) or the data processing means (11) of the terminal (1), that the candidate biometric datum matches with a reference biometric datum;
(d) Transmitting, to the mobile terminal (1) from the server (3), an encrypted form of a virtual key of the locking equipment (2);
(Continued)

(e) Authenticating the mobile terminal (1) to the locking equipment (2) through said cryptographic function and said encrypted form of the virtual key of the locking equipment (2).

20 Claims, 1 Drawing Sheet

(51) Int. Cl.
*G06K 9/00* (2006.01)
*G07C 9/25* (2020.01)

(52) U.S. Cl.
CPC ..... *G07C 9/00309* (2013.01); *G07C 9/00563* (2013.01); *G07C 9/00571* (2013.01); *G07C 9/25* (2020.01); *G07C 2009/00388* (2013.01); *G07C 2009/00412* (2013.01); *G07C 2209/08* (2013.01)

(58) Field of Classification Search
CPC ...... G07C 2009/00412; G07C 2209/08; G07C 9/00309; G07C 9/00563; G07C 9/00571; G07C 9/25
USPC ............................... 340/5.52, 5.53
See application file for complete search history.

(56) References Cited

U.S. PATENT DOCUMENTS

2015/0318994 A1* 11/2015 Walsh .................. H04L 9/3278
713/182
2017/0174180 A1 6/2017 Hoyos et al.

OTHER PUBLICATIONS

Parno et al., "Pinocchio: Nearly Practical Verifiable Computation", in Proceedings of the IEEE Symposium on Security and Privacy, May 2013, pp. 1-16.

* cited by examiner

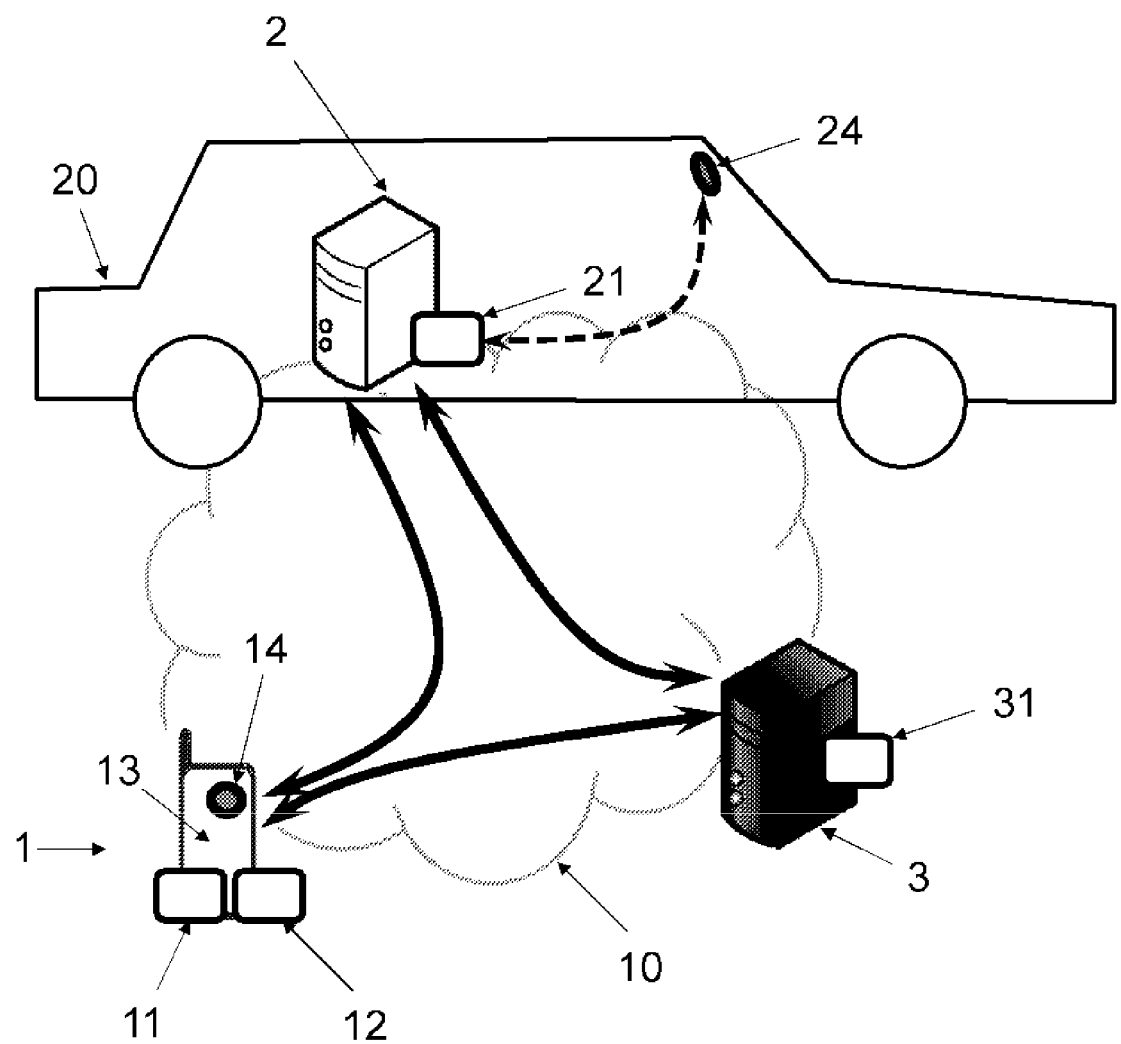

METHOD FOR VERIFYING A BIOMETRIC AUTHENTICATION

FIELD OF THE INVENTION

The invention relates to a method for the remote control of locking equipment for a vehicle via a mobile terminal, comprising the comparison between a candidate biometric datum and at least one reference biometric datum.

STATE OF THE ART

Nowadays, the rental of a vehicle takes a while. After a phone or an online booking, it is generally necessary for the renter and the user to meet at the meeting place on the day of the rental to carry out administrative formalities and proceed to the transmission of the keys.

For example, the user appears to the counter and provides an identity paper and a driving license in order to validate the booking. If everything is good, he/she is given the key in exchange and is informed of the location of the vehicle after having signed a schedule of fixture.

Yet, it is common for users to arrive in groups in the agencies upon landing of a plane or arrival of a train, which creates a long wait that does not please them.

In order to save time, mechanisms for remotely unlocking the vehicle have been proposed as described in document WO2016/102888.

More specifically, a mobile terminal of the user loads a virtual key of the vehicle, and requires the unlocking of the vehicle via this mobile terminal. In response, a control box placed in the vehicle verifies the loaded virtual key (via a challenge-response authentication mechanism) and when appropriate, grants the request.

This mechanism is satisfactory and saves the renter from having to physically travel to the vehicle and give the keys, but does not completely avoid the administrative formalities. Indeed, document WO2016/102888 explains that it is the owner (i.e. the renter) who authorizes the user by issuing a certification request associating an identifier of the mobile terminal of the user and the registration number of the vehicle, in response to which the virtual key is provided.

In practice, this solution makes it possible to anticipate the administrative phase. For example, the user can come to the agency several days before the start of the rental period to provide the identity paper and the driving license, and the staff of the agency can directly initiate the procedure of providing the virtual key. Indeed, it is sufficient to provide that the virtual key is valid only from the time of the start of the rental period (so the user cannot use it to unlock the vehicle sooner). Moreover, this virtual key is not a physical element, so this does not pose a problem that it is provided to several users.

The user leaving his/her train or plane will thus be able to go directly to the vehicle without waiting in line at the agency.

Nevertheless it would be desirable to further simplify the method so as to avoid the need for manual authorization of the user, while improving his/her security.

PRESENTATION OF THE INVENTION

According to a first aspect, the invention relates to a method for the remote control of a locking equipment for a vehicle via a mobile terminal comprising data processing means configured to implement a given cryptographic function and biometric acquisition means, the mobile terminal being connected to the locking equipment as well as to a server via a network, the method being characterized in that it comprises the implementation of steps of:

(a) Issuing, from the terminal to the server, an authentication request to the locking equipment;
(b) Acquiring a candidate biometric datum by the acquisition means;
(c) Verifying, by data processing means of the server or the data processing means of the terminal, that the candidate biometric datum matches with a reference biometric datum;
(d) Transmitting, to the mobile terminal from the server, an encrypted form of a virtual key of the locking equipment;
(e) Authenticating the mobile terminal to the locking equipment through said cryptographic function and said encrypted form of the virtual key of the locking equipment.

According to other advantageous and non-limiting characteristics:

- the mobile terminal comprises data storage means storing a white-box implementation of said cryptographic function;
- step (d) comprises the encryption of the virtual key of the locking equipment as a function of a secret key of the server, said given cryptographic function being a function of said secret key of the server;
- step (a) comprises the prior generation of said white-box implementation of the cryptographic function by the data processing means of the server as a function of said secret key of the server, and the loading of said white-box implementation of said cryptographic function;
- the method comprises a preliminary step (a0) of loading at least one official document;
- said white-box implementation is generated following the verification by the data processing means of the server of said official document;
- step (a0) comprises the generation, by the data processing means of the server or the data processing means of the terminal, of the reference biometric datum from a reference biometric feature associated with said official document;
- step (a0) further comprises the loading of at least two official documents including a driving license and an identity paper;
- step (b) further comprises the transmission of said candidate datum to the server, the server having said reference biometric datum, and step (c) being implemented by the data processing means of the server;
- the terminal has said reference biometric datum, step (c) being implemented by the data processing means of the terminal, and further comprising:
  the generation, by the data processing means of the terminal, of a zero-knowledge proof of the assumption that the candidate biometric datum and the reference biometric datum match; and
  the transmission to the server of said zero-knowledge proof, for verification by the data processing means of the server;
- the server has a hash value of the reference biometric datum, step (c) further comprising the transmission, to the server of said hash value, of the reference biometric datum, for comparison by the data processing means of the server;
- step (e) comprises the deactivation of the locking equipment so as to allow the use of the vehicle;

step (e) comprises the issuing of a challenge from the locking equipment, the determination of a response to said challenge by the data processing means of the terminal by application of said cryptographic function to the encrypted virtual key and to the challenge;

the mobile terminal and the vehicle each comprise geo-location means, step (e) further comprising the verification that the mobile terminal and the vehicle have close positions;

the vehicle further comprises biometric acquisition means, the method further comprising a step (f) of:

Acquiring a confirmation biometric datum by the acquisition means, and transmitting to the server or to the terminal; and Verifying, by the data processing means of the server or the data processing means of the terminal, that the reference biometric datum matches with the candidate biometric datum and/or the reference biometric datum;

the method comprises the repetition of step (f);

the biometric acquisition means consist of optical acquisition means, said biometric datum being a photograph of the user;

the virtual key is associated with a validity time interval, step (e) can be implemented only during said validity time interval.

According to a second aspect, there is provided a set of a mobile terminal and of a server for the remote control of a locking equipment for a vehicle, being connected together as well as to the locking equipment via a network, the terminal comprising data processing means configured to implement a given cryptographic function and biometric acquisition means, the server comprising data processing means, characterized in that the data processing means of the terminal and/or the data processing means of the server are configured to:

Issue, from the terminal to the server, an authentication request to the locking equipment;

Acquire a candidate biometric datum by the acquisition means;

Verify that the candidate biometric datum matches with a reference biometric datum;

Transmit, to the mobile terminal from the server, an encrypted form of a virtual key of the locking equipment;

Authenticate the mobile terminal to the locking equipment through said cryptographic function and said encrypted form of the virtual key of the locking equipment.

According to other advantageous and non-limiting characteristics, the set further comprises the locking equipment.

According to a third and a fourth aspect, the invention proposes a computer program product comprising code instructions for carrying out a method according to the first aspect for the remote control of a locking equipment for a vehicle; and a storage means readable by a computer equipment on which a computer program product comprises code instructions for carrying out a method according to the first aspect for the remote control of a locking equipment for a vehicle.

DESCRIPTION OF THE FIGURES

Other characteristics, objects and advantages of the present invention will become apparent upon reading the following detailed description, in relation to the appended FIGURES, given by way of non-limiting examples and on which:

FIG. 1 schematically represents a system for implementing the method according to the invention.

DETAILED DESCRIPTION OF AT LEAST ONE EMBODIMENT OF THE INVENTION

Architecture

With reference to FIG. 1, there is schematically represented a system for the remote control of a locking device 2 for a vehicle 20. By "locking" is meant here a functional locking, that is to say any way to prevent the use of the vehicle 20. In particular, the locking may be a physical locking (of the doors, but also of the steering wheel, of the gear lever, etc.) or a software locking (locking of the starting for example). Note that it may be a combination of either of these locking means.

Generally, it will be understood that the present method aims at "deactivating" the locking equipment 2 so as to allow the use of the vehicle 20.

This system comprises at least three equipments 1, 2, 3. The first equipment 1 is a personal equipment to an individual, such as his/her mobile phone, as explained below. The second equipment 2 is the locking equipment already described. It is placed in the vehicle 20. It is typically an electronic box connected to an electronic control unit of the vehicle 20 which manages the operation of the vehicle (controls the starting, the central door opening, the engine, etc.) and/or at least one dedicated actuator (for example a jaw locking the gear lever), which can issue a command to lock/unlock the vehicle. The third equipment 3 is a server held and controlled by an entity called trusted entity (for example a vehicle rental company, or an external security solution provider). Note that the server 3 could be disposed in the vehicle 20 and can, as such, be connected filially to the locking equipment 2, or even merged therewith.

The terminal 1 includes data processing means 11, i.e. a computer such as for example a processor, a microprocessor, a controller, a microcontroller, an FPGA, etc. This computer is adapted to execute code instructions in order to implement the method below.

The terminal 1 advantageously comprises a communication interface allowing it to remotely interact with the equipment 2 and the server 3.

The terminal 1 may also comprise data storage means 12 (a memory, for example a flash), a user interface 13 (typically a touch screen), and biometric acquisition means 14 (see below).

This communication interface is preferably the combination of a wireless communication interface, for example of the type Wifi or Bluetooth or mobile phone network (GPRS, 3G, 4G or the like) and any other downstream communication network.

The data means 11 of the terminal 1 are configured to implement a given cryptographic function. This function, which will be seen later that it can be provided by the server 3, in particular in the form of a white-box implementation loaded in the memory 12, uses a secret key (also called private key) and aims at allowing the secure management of a virtual key of the equipment 2. More precisely, by analogy with the physical key of a vehicle that allows opening the doors and starting the engine, the virtual key allows deactivating the locking due to the equipment 2. More precisely, the control of the equipment by the terminal 1 requires that the latter proves its knowledge of the virtual key, as will be seen later. The person skilled in the art may rely on any secret key function such as AES or Triple DES.

The server 3 can store in its memory 32 a database of virtual keys each associated with an equipment 2. Note that a plurality of virtual keys can be available for each of the equipments 2 so as to be able to plan several locations with the same vehicle. The different users renting the vehicle 20 at several times will be assigned various keys, preferably each one associated with a validity time interval (so that a user cannot use the key outside the scheduled rental period).

The other equipments 2, 3 also include, for their part, data processing means 21, 31, i.e. a computer such as for example a processor, a microprocessor, a controller, a microcontroller, an FPGA, etc. This computer is adapted to execute code instructions in order to implement the method below.

The other equipments 2, 3 advantageously also comprise communication interfaces allowing them to remotely interact with each other and with the terminal 1.

Preferably, the terminal 1 and/or the server 3 are capable of generating a biometric datum from a biometric feature of an individual. The biometric feature may for example be the shape of the face, or one or more irises of the individual. The extraction of the biometric datum is implemented by a treatment of the image of the biometric feature which depends on the nature of the biometric feature. Various image processes for extracting biometric data are known to the person skilled in the art. By way of non-limiting example, the extraction of the biometric datum may comprise an extraction of particular points or of a shape of the face in the case where the image is an image of the face of the individual.

The terminal 1 comprises as such biometric acquisition means 14, typically an image sensor, for example a digital photographic apparatus or a digital camera, adapted to acquire at least one image of a biometric feature of an individual.

Very advantageously, the terminal 1 described above is a personal electronic device to the individual, for example a mobile phone or "smartphone", an electronic tablet or a personal computer.

Note that in a preferred embodiment which will be described later, the vehicle 20 can also be equipped with biometric acquisition means 24 of the same type as those of the terminal 1, in particular directly connected to the equipment 2. These means 24 may take the form of a small camera disposed in the passenger compartment so as to observe the driver's face (for example in the dashboard). Note that vehicles 20 equipped with such a camera are also already known for acquiring images of the driver's face, in particular for detecting signs of falling asleep (blinking of the eyelids, forward falling of the head, etc.).

As will be seen, the terminal 1 or the server 3 implements an authentication of the individual, that is to say compares a biometric datum called candidate biometric data, because IT IS freshly acquired on the individual, with a single biometric datum called reference biometric datum, supposed to come from the same individual, in order to verify that the individual from whom the two data were obtained is indeed the same individual.

In this case, the reference biometric datum used for the authentication is advantageously a datum recorded in an identity document of the individual. For example, the biometric datum may be an image of the face appearing on an identity document, or an image of the face or of at least one iris of the individual recorded in a radiofrequency chip contained in the document.

In a first embodiment, the server 3 has the reference biometric datum and the terminal 1 transfers the candidate biometric datum thereto so that it performs the authentication.

In a second embodiment, the server 3 does not have biometric data, so as to guarantee the privacy of the users. Thus, as will be seen, it is the terminal 1 that performs the authentication itself.

In both cases, the use of the terminal 1 to provide a candidate biometric datum and the implementation of a comparison with a reference biometric datum allows an individual to perform an authentication by himself/herself before presenting the result to the second equipment 2. Thus, the time-consuming administrative step of appearing before a counter is no longer necessary.

Enrollment

In a preferred embodiment, the method comprises a preliminary "enrollment" step (a0) allowing to make the reference biometric datum available on the terminal 1 or on the server 3 (depending on the one which will perform the comparison). This step can be implemented long before the rest of the method, and does not need to be repeated at each occurrence of the method (it can for example be provided once a year). It can also be performed concomitantly with the first step (a) of the authentication method itself which will be described later.

Typically, this step comprises:
- The loading of a reference document either just on the terminal 1 or on the server 3 following the retransmission by the terminal 1;
- The generation by the data processing means 11 of the terminal 1 (or the data processing means 31 of the server 3) of the reference biometric datum from a reference biometric feature associated with an official document.

In so far as the rental of a vehicle 20 is aimed, preferably at least two official documents are loaded including a driving license and an identity paper such as a passport or an identity card.

In the case where it is the terminal 1 that stores the reference biometric datum, step (a0) may also comprise the generation of a hash value of the reference biometric datum, and possibly the obtaining of a signature of the reference biometric datum, for transmission to the server 3. The objective is to be able, if it is the terminal 1 that performs the authentication, to ensure that the terminal has a reliable and unaltered reference biometric datum.

The "hash value" of a biometric datum (also called "digest" of the datum) is obtained by applying a cryptographic hash function to the datum (typically SHA-1 or SHA-2 families, in particular SHA-256). The hash value has a fixed size and reveals nothing about the datum from which it is derived: the biometric datum cannot be found from this hash value, at least as long as the hash function used is considered reliable. However, the hash value can be recomputed from the datum to verify that it is correct. The hash value of the biometric datum can thus be transmitted to any equipment without disclosing information on the datum itself and therefore on the user privacy.

The first part can be done in many ways. For example, the user can directly retrieve on his/her terminal 1 the biometric feature recorded in a radiofrequency chip contained in the document (if the terminal 1 has an NFC type radiofrequency reader), take a photograph of this document with its means 14, or a photograph of himself/herself, if necessary in the presence of a representative of the authority (for example at a town hall counter).

Obtaining the signature advantageously requires validating, by a control authority, the biometric datum generated as reference datum.

Thus, in a known manner, obtaining the signature of the reference biometric datum in step (a0) preferably comprises transmitting (by the terminal 1 or the server 3) to an authority entity of the official document (or at least of one photograph), the reference biometric datum, and the hash value of the reference biometric datum, and receiving in return the signature of the reference biometric datum, after verification.

This verification can be done in many ways, and consists simply of verifying that the official document is authentic, that the reference biometric datum subject to verification is indeed consistent with the official document, and that the hash value is indeed that of the subject datum. If there are several official documents, it is made sure that each one is valid, but the reference biometric datum needs to be obtained for only one of them.

The electronic signature of the datum makes it possible to guarantee its integrity and this in a definitive way (non-repudiation), by analogy with the handwritten signature of a paper document, and is well known to the person skilled in the art. It is generated by the authority entity from the hash value of the reference biometric datum, and generally consists of an encrypted form of the hash value of the reference biometric datum. For this purpose, in a known manner, data processing means of the authority entity apply, for example, an asymmetric encryption function to the hash value and thus retransmit it encrypted as a signature.

In one embodiment, the server 3 may act as a trusted authority.

In general, it will be understood that step (a0) may be implemented in any way securely providing to the terminal 1 the reference biometric datum advantageously signed by an authority for example government authority.

In the case where the cryptographic function is implemented in a white-box manner, preferably said white-box implementation is generated following the verification by the data processing means 31 of the server 3 of said official document, and transmitted to the terminal 1 for storage on the memory 12.

It should be repeated that by "white-box implementation" is meant an implementation of the cryptographic function making the extraction of secrets or keys impossible, even in case of attack providing the attacker full access to the software implementation of the algorithm. More precisely, a function is considered as a "white box" when its mechanisms are visible and allow understanding its functioning. In other words, it is directly assumed that the attacker has access to everything he/she wants (the binary is completely visible and modifiable by the attacker and the latter has full control of the execution platform). Consequently, the implementation itself is the only line of defense.

In the present case, said cryptographic function is a secret-key cryptographic function, and therefore by "white-box implementation" is meant a representation of the function that does not allow going back to the internal states or to the parameters when the operation is executed (by application of the white-box implementation to the input data), in other words that avoids having said secret key unencrypted, for example by representing the computation by a table. In other words, the secret key is "obfuscated" in the white-box implementation of the cryptographic function.

Thus, particularly preferably, the data processing means of the server generate a secret key uniquely associated with the terminal 1, generate the white-box implementation of the cryptographic function for this secret key, and store it for later use to encrypt a virtual key of the equipment 2 (see below).

Note that the notion of "verification of the official document" by the server 3 is to be understood in the broad sense. If the server 3 does not carry out the generation of the reference biometric datum (and therefore does not have access to the official document), then it may be the verification of the signature of the reference biometric datum (transmitted by the terminal 1), in particular with a key of the authority provided to the server 3.

More specifically, the data processing means 31 of the server 31 will decrypt the signature with this key, and verify that the result is indeed the hash value also transmitted.

In general, this step (a0) can be implemented via an application installed on the terminal 1. At first launch, the application requires the loading of the official document(s), manages their verification and the obtaining of the reference biometric data, and ends with the request to the server 3 of the white-box implementation. If everything is in order, the latter is received and loaded in response, so as to make the application fully operational for the implementation of the rest of the method.

Note that it can be expected to repeat it for example once a year to ensure the validity of the official documents and renew the secret key.

Selection and Obtaining of the Candidate Biometric Data

The method begins with a step (a) of issuing, from the terminal 1 to the server 3, an authentication request to the locking equipment 2.

It should be understood that this step (a) can be well upstream of the rental itself, but long after the enrolment (a0).

This step can be seen as a selection of the vehicle 20. Indeed, the user selects in practice a vehicle 20, not an equipment 2. In practice, this step is expressed as a request for access to a chosen vehicle 20, which is expressed by issuing an authentication request to the locking equipment 2 of this vehicle.

According to one embodiment, the user chooses directly from several vehicles proposed via the one he/she wishes to rent. According to another embodiment, the user has only to inform on the category, the model, etc. of the vehicle he/she wishes to rent, on the location of the rental, and on the associated dates, and it is in practice the server 3 (or another server) that will offer him/her a vehicle 20 that meets the criteria. If the user is satisfied, he/she formally issues a request for access to this vehicle.

In a step (b), a "fresh" candidate biometric datum will be obtained. Step (b) comprises the acquisition of a candidate biometric datum by the acquisition means 14. In the case of an image sensor, it is typically a "selfie".

Step (b) may comprise the generation of the candidate biometric datum from a biometric feature provided by the biometric acquisition means 14, and optionally the generation of a hash value of the obtained candidate biometric datum is then generated.

The terminal 1 can transmit the candidate biometric datum to the server 3, but if the comparison is made at the terminal 1, it is preferable to transmit the hash value of the candidate biometric datum (rather than nothing) to the server 3 for subsequent verification.

Preferably, the biometric acquisition means 14 are capable of detecting the living, so as to ensure that the candidate biometric datum is derived from a "real" feature.

First Embodiment of the Authentication Method

The method then comprises a step (c) of verifying, by data processing means 31 of the server 3 or the data processing means 11 of the terminal 1, that the candidate biometric datum matches with the reference biometric datum.

According to the first embodiment where the server 3 has, in advance, the reference biometric datum and the step (b) comprises the transmission of the candidate biometric datum, it is the data processing means 31 of the server 3 that implement this step (c).

This verification comprises, in a known manner, the comparison of the candidate biometric datum and the reference biometric datum.

Indeed, in a known manner, the candidate biometric datum and the reference biometric datum match if their distance according to a given comparison function is less than a predetermined threshold.

Thus, the implementation of the comparison comprises the computation of a distance between the data, the definition of which varies according to the nature of the considered biometric data. The computation of the distance comprises the computation of a polynomial between the components of the biometric data, and advantageously the computation of a scalar product.

For example, in the case where the biometric data were obtained from iris images, a distance conventionally used to compare two data is the Hamming distance. In the case where the biometric data have been obtained from images of the individual's face, it is common to use Euclidean distance.

This type of comparison is known to the person skilled in the art and will not be described in more detail.

The individual is authenticated if the comparison reveals a rate of similarity between the candidate datum and the reference datum exceeding a certain threshold, the definition of which depends on the computed distance.

Consequently, if the verification is conclusive (i.e. if the candidate biometric datum matches with the reference biometric datum), in a step (d) the server 3 transmits to the mobile terminal 1 an encrypted form of a virtual key of the locking equipment 2, for use by the cryptographic function. Naturally, if the candidate biometric datum and the reference biometric datum do not match, the encrypted form of the virtual key is not transmitted, so that the vehicle cannot be unlocked. Note that the virtual key is not unencrypted, which prevents a malicious user from extracting it.

The encryption of the virtual key is performed on-the-fly by the data processing means 31 of the server 3, as a function of the secret key associated with the terminal 1 (i.e. used, and if necessary obfuscated, by said cryptographic function implemented by the data processing means 11).

Second Embodiment of the Authentication Method

In the second embodiment (where the reference and candidate biometric data are processed by the only terminal 1), the verification it matches is non-interactive, that is to say, it requires only a "one-way" of information from the terminal 1 to the server 3, and no "return". And especially as explained, the server 3 will receive neither the candidate biometric datum nor the reference biometric datum (or any datum allowing to trace back to these data), although it is nevertheless possible for the validation entity to know for sure whether the candidate and reference biometric data match.

For this purpose, a cryptographic protocol generating a "proof" that the candidate biometric datum and the reference biometric datum match is used, this proof revealing nothing more than the fact that these biometric data are well possessed by the producer of the proof.

The Pinocchio Protocol presented in the publication "Bryan Parno, Craig Gentry, Jon Howell, and Mariana Raykova, Pinocchio: Nearly Practical Verifiable Computation, in Proceedings of the IEEE Symposium on Security and Privacy, IEEE, 21 May 2013" was one of the first verifiable computation protocols allowing the executor to compute in a verifiable manner the application of any function and the person who gives the order to verify the associated proof in a computation time less than the one necessary to perform the computation itself.

Thus, step (c) preferably comprises the generation, by the data processing means 11 of the terminal 1, of a zero-knowledge proof of the assumption that the candidate biometric datum and the reference biometric datum match.

Specifically, said zero-knowledge proof assures the following statement: "Given two hash values, there are a candidate biometric datum and a reference biometric datum having, as respective hash values, the given hash values, and matching".

Thus, the two hash values can be related to the candidate and reference biometric data, but information on the content of these biometric data cannot be obtained. The cryptographic protocol gives a quickly verifiable proof (less than half a second) that cannot be falsified: it is almost impossible (probability less than $1/2^{80}$, even less than $1/2^{128}$ depending on the parameters chosen for achieving the proof, the latter then being slower to achieve) to accept a proof of the affirmation above if the process did not occur in accordance with what is specified.

In the achievement of the proof, the terminal 1 uses the possibility of generating proofs with zero knowledge disclosure in order to hide the biometric data. Thus, the proof gives no information on the biometric data themselves.

Naturally, step (c) advantageously comprises the prior verification, by the data processing means 11 of the terminal 1, that the candidate biometric datum and the reference biometric datum match, by comparing the candidate biometric datum and the reference biometric datum in one of the previously described ways.

For example, the proof may be more precisely a zero-knowledge proof of the assumption that, given two hash values, there are a candidate biometric datum and a reference biometric datum having, as respective hash values, the given hash values, such that their distance according to the given comparison function is less than the predetermined threshold.

Preferably, said zero-knowledge proof is a cryptographic object of the type zkSNARK ("zero-knowledge Succinct Non Interactive ARgument of Knowledge". The person skilled in the art will be able to consult the application FR1653890 to find out more about zero-knowledge proofs adapted to the comparison of biometric data.

In particular, the Pinocchio protocol allows the person who achieves the proof to hide some of the inputs of the computation of which he/she achieves the proof. In the present case, it concerns carrying out the following computation:

Input: the hash values of the candidate $h_{fresh}=H(t_{fresh})$ and reference $h_{ref}=H(t_{ref})$ biometric datum, the result of the comparison of the candidate $h_{fresh}=H(t_{fresh})$ and reference $h_{ref}=H(t_{ref})$ biometric data (i.e. the boolean according to whether they match or not), and an initialization vector IV.

Private input: the candidate $t_{fresh}$ and reference $t_{ref}$ biometric data.

Output: the proof if that the prover indeed knows biometric data $t_{fresh}$ and $t_{ref}$ which are hacked in $h_{fresh}$ and $h_{ref}$ and whose result of the comparison is the one expected.

Step (c) then comprises the transmission to the server 3 of said zero-knowledge proof, of the hash value of the candidate biometric datum, and of the hash value of the reference biometric datum (if not done so far). Optionally, the signature of the reference biometric datum is again transmitted for comparison with that of the server 1, but no other datum is transmitted (i.e. only the hash value of the candidate biometric datum, the hash value of the reference biometric datum, and the signature of the reference biometric datum are transmitted). It should be repeated that the biometric data are, for their part, not transmitted in this embodiment.

The data processing means 31 of the server 3 can then verify that the zero-knowledge proof is valid. The signature can also be verified again.

If so, the user is authenticated, and step (d) is implemented.

The verification of the proof is not interactive (the server 3 does not need to contact the prover, i.e. the terminal 1) and is done simply in constant time by verifying that the proof is valid, which demonstrates (to the nearest probability) to the server 3 that the supposed property is true, i.e. that the user has a candidate biometric datum and a reference biometric datum that match. It is thereby convinced that the identity of the user is confirmed (and that no one has usurped an identity) despite the absence of biometric datum.

Thanks to the proof, the confidentiality can be total (since the generation of the proof does not require communication) without the server 3 taking a risk since the proof assures it that the proof entity has indeed the biometric data.

The proof is short (even very short—of the order of a few hundred bytes), transmitting it with the hash values of the document does not pose any problem of bandwidth. In addition, the verification of this proof is fast (in constant time, a few tens of thousandths of a second), which does not increase the computation load at the data processing means 31 of the server 3, that must manage hundreds of simultaneous authentications. The generation of the proof is, for its part, heavier in terms of computation time, but as step (c) is implemented on the terminal side 1 which is personal (and is involved only in the authentication of its only owner), this additional computation time is not problematic, and even well received by the users who have no problem in spending a few tens of seconds of the operating time of their personal terminal if it is to avoid waiting in line at counters.

Thus, the present method is optimal for both the user and the provider (the renter).
Unlocking In a step (e), the mobile terminal 1 authenticates to the locking equipment 2 through said cryptographic function and said encrypted form of the virtual key of the locking equipment 2.

More precisely, the cryptographic function allows indirectly "decrypting" the virtual key vis-à-vis the equipment 2. Preferably, however, the virtual key never appears unencrypted for security reasons.

If the authentication is obtained, step (e) comprises as explained the subsequent deactivation of the locking equipment 2 so as to allow the use of the vehicle 20.

According to a preferred embodiment, in order to implement the authentication, step (e) comprises the issuing of a challenge from the locking equipment 2, and the determination of a response to said challenge by the data processing means of the terminal 1 by application of said cryptographic function to the encrypted virtual key and to the challenge.

The challenge can be generated randomly or pseudo-randomly by the processing means 21 of the terminal 1.

Then, in step (e), the cryptographic function takes as input the virtual key and the challenge, and deduces therefrom a response to the challenge. The same computation is made on the equipment side 2 so as to compute the expected response. Note that this equipment may have a plurality of virtual keys all valid, and therefore compute a plurality of expected responses (by using a cryptographic function of the same type as that implemented by the data processing means 11 of the terminal 1).

The data processing means 21 of the equipment 2 then verify that the response received from the terminal 1 is indeed one of these expected responses, which proves the knowledge of the virtual key by the terminal 1 without the need for transmitting it.

Note that other mechanisms can be provided, for example the transmission by the equipment 2 of a public key for the encryption by the terminal of the virtual key (decryption and re-encryption on-the-fly by the implemented cryptographic function), the transmission of the virtual key encrypted by the key of the equipment 2, and its decryption (by using a secret key of the equipment 2) and its comparison with the virtual keys available to the equipment 2.

On the other hand, step (e) may comprise additional verifications to allow authentication, i.e. the knowledge of the virtual key is not necessarily sufficient to obtain the subsequent deactivation of the locking equipment 2.

First of all, as explained, the virtual key can be associated with a validity time interval (the duration of the rental), step (e) can be implemented only during said validity time interval. In other words, step (e) comprises the verification, by the data processing means 21 of the equipment 2, that the present moment is in said validity period, i.e. that one does not attempt to access to the vehicle 20 before the scheduled start of the rental period.

Then, the mobile terminal 1 and the vehicle 20 may each comprise geolocation means (for example a GPS, or by triangulation), step (e) then further comprising the verification that the mobile terminal 1 and the vehicle 20 have close positions. By close, is meant next to the vehicle 20, that is to say the user must have the vehicle 20 in immediate sight. In practice, close can be defined as at a distance less than a given threshold (representative of being near), typically a few meters. The idea is to verify that the user is physically present in the vicinity of the vehicle 20 when it requires the unlocking, in order to avoid remote fraud.

In addition or alternatively, if the vehicle 20 further comprises biometric acquisition means 24 (connected to the equipment 2), the method preferably further comprises a step (f) (which may be included in step (e) before the subsequent deactivation of the locking equipment 2) of:

Acquiring a confirmation biometric datum (which is in practice comparable with the candidate biometric datum, just more recent) by the acquisition means 24, and transmitting to the server 3 or to the terminal 1 (the one who has the reference biometric datum); and Verifying, by the data processing means 31 of the server 3 or the data processing means 11 of the terminal 1, that the confirmation biometric datum matches with the candidate biometric datum and/or the reference biometric datum (in the same way as for step (c)).

Indeed, a case can be considered in which the user who made the rental would implement the method, but would let a third party drive in his/her place, which is not allowed. The objective of step (f) is to verify that the driver is indeed the user who has authenticated, who is the only one who really has the right to drive.

Preferably, step (f) is repeated at regular intervals, for example every hour, or at each starting, so as to make sure that once the vehicle 20 has been unlocked, there is no an exchange of drivers.

It should be noted that some rental contracts authorize several drivers. The idea is to implement, for each of the additional drivers, a specific "enrollment" (for example after step (a), this additional enrollment being able to resume all or part of step (a0) but involving no modification of the implementation of the cryptographic function, which is related to the terminal 1), in which the required identity documents will be provided (so as to have reference biometric data for the additional drivers). Steps (b) and (c) are where appropriate implemented for these other drivers.

It should be noted that there is not necessarily any need for reference biometric datum for the other drivers, and that it may be possibly sufficient to implement step (b) to acquire a candidate datum.

Step (f) then verifies that the confirmation biometric datum matches with one of the candidate biometric data and/or one of the reference biometric data.

Set of Equipments

According to a second aspect, there is provided a set of biometric data processing for the implementation of the method according to the first aspect, i.e. for the remote control of a locking equipment 2 for a vehicle 20.

The set comprises a terminal 1 and a server 3 connected together as well as to the locking equipment 2. The set can comprise the equipment 2.

As explained, the terminal 1 comprises data processing means 11 configured to implement a given cryptographic function and biometric acquisition means 14; and the server 3 comprises data processing means 31.

The data processing means 11 of the terminal 1 and/or the data processing means 31 of the server 3 are configured to:

Issue, from the terminal 1 to the server 3, an authentication request to the locking equipment 2;

Acquire a candidate biometric datum by the acquisition means 14;

Verify that the candidate biometric datum matches with a reference biometric datum;

If the candidate biometric datum matches with the reference biometric datum, transmit to the mobile terminal 1 from the server 3 an encrypted form of a virtual key of the locking equipment 2;

Authenticate the mobile terminal 1 to the locking equipment 2 through said cryptographic function and said encrypted form of the virtual key of the locking equipment 2

In the embodiment where it is the terminal 1 that has the reference biometric datum, this terminal can implement most of the method according to the first aspect.

The invention thus also relates to a mobile terminal 1 for the remote control of a locking device 2 for a vehicle 20, comprising data processing means 11 configured to implement a given cryptographic function and biometric acquisition means 14, the mobile terminal 1 being connected to the locking equipment 2 as well as to a server 3 via a network 10, the mobile terminal 1 being characterized in that the data processing means 11 are configured to:

Issue, from the terminal 1 to the server 3, an authentication request to the locking equipment 2;

Acquire a candidate biometric datum by the acquisition means 14;

Verify that the candidate biometric datum matches with a reference biometric datum;

If the candidate biometric datum matches with the reference biometric datum, receive from the server 3 an encrypted form of a virtual key of the locking equipment 2;

Authenticate the mobile terminal 1 to the locking equipment 2 through said cryptographic function and said encrypted form of the virtual key of the locking equipment 2.

Computer Program Product

According to a third and a fourth aspect, the invention relates to a computer program product comprising code instructions for carrying out (in particular on the data processing means 11, 21, 31, of the terminal 1, of the locking equipment 2 and/or of the server 3) a method according to the first aspect of the invention for the remote control of the locking equipment 2 for a vehicle 20, as well as storage means readable by a computer equipment (a memory of the equipments 1, 2, 3) on which this computer program product is found.

The invention claimed is:

1. A method for the remote control of a locking equipment for a vehicle via a mobile terminal comprising a data processor configured to implement a given cryptographic function, and a biometric acquisition unit, the mobile terminal being connected to the locking equipment as well as to a server via a network, the method being characterized in that it comprises the implementation of steps of:

(a) Issuing, from the terminal to the server, an authentication request to the locking equipment;

(b) Acquiring a candidate biometric datum by the biometric acquisition unit;

(c) Verifying, by a data processor of the server or the data processor of the terminal, that the candidate biometric datum matches with a reference biometric datum;

(d) If the candidate biometric datum matches with the reference biometric datum, transmitting to the mobile terminal from the server an encrypted form of a virtual key of the locking equipment;

(e) Authenticating the mobile terminal to the locking equipment through said cryptographic function and said encrypted function of the virtual key of the locking equipment;

wherein the terminal has said reference biometric datum, step (c) being implemented by the data processor of the terminal, and further comprising:

the generation, by the data processor of the terminal, of a zero-knowledge proof of the assumption that the candidate biometric datum and the reference biometric datum match; and the transmission to the server of said zero-knowledge proof, for verification by the data processor of the server.

2. The method according to claim 1, wherein the mobile terminal comprises a memory storing a white-box implementation of said cryptographic function.

3. The method according to claim 1, wherein step (d) comprises the encryption of the virtual key of the locking equipment as a function of a secret key of the server, said given cryptographic function being a function of said secret key of the server.

4. The method according to claim 3, wherein step (a) comprises the prior generation of a white-box implementation of the cryptographic function by the data processor of the server as a function of said secret key of the server, and the loading of said white-box implementation of said cryptographic function.

5. The method according to claim 1, comprising a preliminary step (a0) of loading at least one official document.

6. The method according to claim 5, wherein a white-box implementation of the cryptographic function is generated following the verification by the data processor of the server of said official document.

7. The method according to claim 5, wherein step (a0) comprises the generation, by the data processor of the server or the data processor of the terminal, of the reference biometric datum from a reference biometric feature associated with said official document.

8. The method according to claim 5, wherein step (a0) further comprises the loading of at least two official documents including a driving license and an identity paper.

9. The method according to claim 1, wherein step (b) further comprises the transmission of said candidate datum to the server, the server having said reference biometric datum, and step (c) being implemented by the data processor of the server.

10. The method according to claim 1, wherein the server has a hash value of the reference biometric datum, step (c) further comprising the transmission, to the server of said hash value, of the reference biometric datum, for comparison by the data processor of the server.

11. The method according to claim 1, wherein step (e) comprises the deactivation of the locking equipment so as to allow the use of the vehicle.

12. The method according to claim 1, wherein step (e) comprises the issuing a challenge from the locking equipment, the determination of a response to said challenge by the data processor of the terminal by application of said cryptographic function to the encrypted virtual key and to the challenge.

13. The method according to claim 1, wherein the mobile terminal and the vehicle each comprise a geolocation unit, step (e) further comprising the verification that the mobile terminal and the vehicle have close positions.

14. The method according to claim 1, wherein the vehicle further comprises a biometric acquisition unit, the method further comprising a step (f) of:
Acquiring a confirmation biometric datum by the biometric acquisition unit of the vehicle, and transmitting to the server or to the terminal; and
Verifying, by the data processor of the server or the data processor of the terminal, that the reference biometric datum matches with the candidate biometric datum and/or the reference biometric datum.

15. The method of claim 14, comprising the repetition of step (f).

16. The method according to claim 1, wherein the biometric acquisition unit is an optical acquisition unit, said biometric datum being a photograph of the user.

17. The method according to claim 1, wherein the virtual key is associated with a validity time interval, step (e) can be implemented only during said validity time interval.

18. An assembly of a mobile terminal and of a server for the remote control of a locking equipment for a vehicle, being connected together as well as to the locking equipment via a network, the terminal comprising a data processor configured to implement a given cryptographic function and a biometric acquisition unit, the server comprising a data processor, wherein the data processor of the terminal and/or the data processor of the server is/are configured to:
Issue, from the terminal to the server, an authentication request to the locking equipment;
Acquire a candidate biometric datum by the acquisition unit;
Verify that the candidate biometric datum matches with a reference biometric datum;
If the candidate biometric datum matches with the reference biometric datum, transmit to the mobile terminal from the server an encrypted form of a virtual key of the locking equipment;
Authenticate the mobile terminal to the locking equipment through said cryptographic function and said encrypted form of the virtual key of the locking equipment;
wherein the terminal has said reference biometric datum, the data processor of the terminal generates a zero-knowledge proof of the assumption that the candidate biometric datum and the reference biometric datum match; and
the transmission to the server of said zero-knowledge proof for verification by the data processor of the server.

19. The assembly of claim 18, further comprising the locking equipment.

20. Non-transitory computer readable support with a memory storing code instructions for the implementation of the method according to claim 1, when instructions are executed by a computer reading said non-transitory computer readable support.

* * * * *